(12) United States Patent
Braghin et al.

(10) Patent No.: US 11,983,291 B2
(45) Date of Patent: May 14, 2024

(54) POLICY-DRIVEN VIEWS OF DATASETS

(71) Applicant: International Business Machines Corporation, Armonk, NY (US)

(72) Inventors: Stefano Braghin, Dublin (IE); Michele Gazzetti, Dublin (IE); Ioannis Gkoufas, East Road East Wall (IE); Marco Simioni, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 451 days.

(21) Appl. No.: 17/121,096

(22) Filed: Dec. 14, 2020

(65) Prior Publication Data

US 2022/0188447 A1 Jun. 16, 2022

(51) Int. Cl.
| | |
|---|---|
| *G06F 21/62* | (2013.01) |
| *G06F 16/23* | (2019.01) |
| *G06F 21/31* | (2013.01) |
| *G06F 21/60* | (2013.01) |

(52) U.S. Cl.
CPC ...... *G06F 21/6227* (2013.01); *G06F 16/2393* (2019.01); *G06F 21/31* (2013.01); *G06F 21/602* (2013.01)

(58) Field of Classification Search
CPC .. G06F 21/6227; G06F 16/2393; G06F 21/31; G06F 21/602
See application file for complete search history.

(56) References Cited

U.S. PATENT DOCUMENTS

| | | |
|---|---|---|
| 7,200,747 B2 | 4/2007 | Riedel et al. |
| 8,381,306 B2 | 2/2013 | McPherson et al. |
| 9,098,714 B2 | 8/2015 | Sharp et al. |
| 9,825,945 B2 | 11/2017 | Adam et al. |
| 9,875,372 B2 * | 1/2018 | Stuntebeck ......... G06F 21/6218 |

(Continued)

OTHER PUBLICATIONS

"Materialized Views with Access Control: Towards Authorization-Aware BI Applications," IP.com No. IPCOM000176069D, Nov. 4, 2008, 21 pages.

(Continued)

*Primary Examiner* — Kambiz Zand
*Assistant Examiner* — Afaq Ali
(74) *Attorney, Agent, or Firm* — Amin, Turocy & Watson, LLP

(57) ABSTRACT

Systems and techniques that facilitate policy-driven views of datasets are provided. In various embodiments, a system can comprise a data component that can access a dataset. In various instances, the system can further comprise a view policy component that can respectively correlate a set of security credentials to a set of view instructions associated with the dataset. In various embodiments, the system can further comprise an input component that can receive as input a first security credential that is listed in the set of security credentials. In various aspects, the system can further comprise an output component that can identify a first view instruction that is listed in the set of view instructions associated with the dataset, wherein the first view instruction is respectively correlated to the first security credential. In various cases, the output component can generate as output a view of the dataset based on the first view instruction.

20 Claims, 12 Drawing Sheets

(56) References Cited

U.S. PATENT DOCUMENTS

| | | | |
|---|---|---|---|
| 11,132,459 B1* | 9/2021 | Lim | G06F 21/604 |
| 11,580,358 B1* | 2/2023 | Ernest | G06N 5/048 |
| 11,803,650 B1* | 10/2023 | Hocanin | G06F 16/221 |
| 2004/0015723 A1* | 1/2004 | Pham | H04L 63/10 |
| | | | 709/217 |
| 2006/0129809 A1* | 6/2006 | Battagin | G06F 21/6209 |
| | | | 713/166 |
| 2012/0151378 A1* | 6/2012 | Parish | G06F 16/955 |
| | | | 715/751 |
| 2015/0324593 A1* | 11/2015 | Abuelsaad | H04L 63/168 |
| | | | 726/26 |
| 2015/0381370 A1* | 12/2015 | Lam | G06F 16/1824 |
| | | | 713/176 |
| 2016/0057115 A1* | 2/2016 | Abuelsaad | G06F 21/606 |
| | | | 713/152 |
| 2016/0070928 A1* | 3/2016 | Braun | G06F 21/6254 |
| | | | 726/1 |
| 2017/0039376 A1* | 2/2017 | Skipper | G06F 21/604 |
| 2017/0039378 A1* | 2/2017 | Skipper | G06F 21/6209 |
| 2019/0087596 A1* | 3/2019 | Lin | H04L 63/10 |
| 2020/0159946 A1* | 5/2020 | Castinado | H04L 63/08 |
| 2020/0320406 A1 | 10/2020 | Antonatos et al. | |
| 2022/0414262 A1* | 12/2022 | Degioanni | G06F 21/6254 |

OTHER PUBLICATIONS

Gabillon et al., "A View-Based Access Control Model for SPARQL," Fourth International Conference on Network and System Security, 2010, 9 pages.

Sar et al., "The Hippocratic File System: Protecting Privacy in Networked Storage," Technical Report, Computer Science Department, Stanford University, Aug. 2005, 14 pages.

Wang et al., "Protecting outsourced data in cloud computing through access management," Concurrency Computat.: Pract. Exper., 2016, 16 pages.

"Security and Privacy Preserving in Social Networks," Springer, 2013, 373 pages.

Sicuranza et al., "Secure healthcare data sharing among federated health information systems," International Journal of Critical Computer-Based Systems, 2013, 25 pages.

Ciampi et al., "A federated interoperability architecture for health information systems," International Journal of Internet Protocol Technology, 2013, 14 pages.

Appari et al., "Information security and privacy in healthcare: current state of research," International Journal of Internet and Enterprise Management, 2010, 36 pages.

Sheng et al., "A privacy-protecting file system on public cloud storage," International Conference on Cloud and Service Computing, 2011, 9 pages.

Paul et al., "A Possible Solution for Privacy Preserving Cloud Data Storage," IEEE International Conference on Cloud Engineering, 2015, 7 pages.

Mell, Peter, et al. "The NIST Definition of Cloud Computing." National Institute of Standards and Technology. Sep. 2011. 7 pages.

"Parquet" https://parquet.apache.org/, Last Accessed Dec. 14, 2020, 2 pages.

* cited by examiner

POLICY-DRIVEN VIEWS OF DATASETS

BACKGROUND

The subject disclosure relates to data access-control, and more specifically to policy-driven views of datasets.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate policy-driven views of datasets are described.

According to one or more embodiments, a system is provided. The system can comprise a memory that can store computer-executable components. The system can further comprise a processor that can be operably coupled to the memory and that can execute the computer-executable components stored in the memory. In various embodiments, the computer-executable components can comprise a data component that can access a dataset. In various instances, the computer-executable components can further comprise a view policy component that can respectively correlate a set of security credentials to a set of view instructions associated with the dataset. In various embodiments, the computer-executable components can further comprise an input component that can receive as input a first security credential that is listed in the set of security credentials. In various aspects, the computer-executable components can further comprise an output component that can identify a first view instruction that is listed in the set of view instructions associated with the dataset, wherein the first view instruction is respectively correlated to the first security credential. In various cases, the output component can generate as output a view of the dataset based on the first view instruction.

According to one or more embodiments, the above-described system can be implemented as a computer-implemented method and/or computer program product.

DETAILED DESCRIPTION

Figure 1:
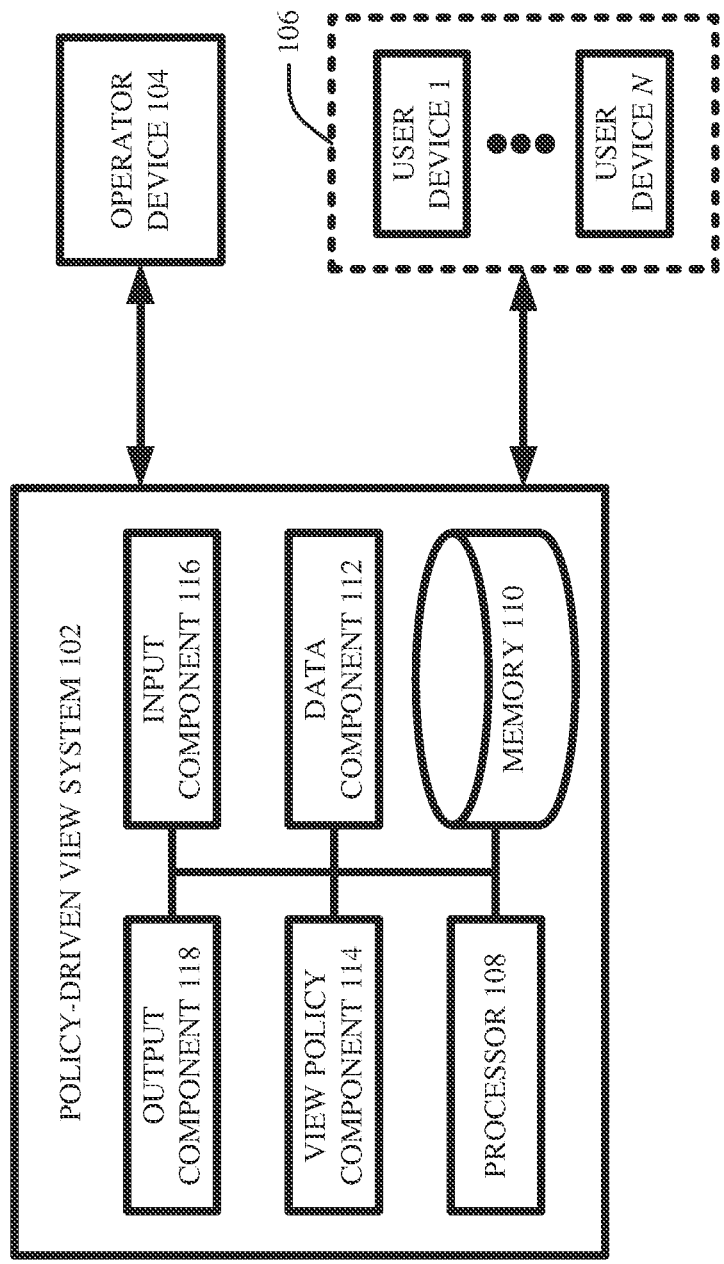
FIG. 1 illustrates a block diagram of an example, non-limiting system that facilitates policy-driven views of datasets in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

A dataset can be electronically-stored information that is accessible, via any suitable wired and/or wireless electronic connection, to a computing device (e.g., a combination of computer hardware and/or computer software). A dataset can exhibit any suitable structure (e.g., a graph structure, a relational/tabular structure, a hybrid structure). Often, a dataset can include sensitive information, and thus can be subject to encryption and/or other access-control measures so as to prevent unauthorized entities (e.g., human, machine, and/or otherwise) from reading, distributing, editing, and/or otherwise accessing the dataset. For example, a dataset can be password-protected, so that only entities that provide valid security credentials (e.g., user identifier and/or password) are granted access to the dataset.

Conventionally, when encryption and/or other access control measures are implemented to protect a dataset, they apply uniformly to the entire dataset. In other words, an entity that provides valid security credentials is conventionally granted access to the entire dataset (e.g., granted access to all of the information that is contained within the encrypted and/or otherwise access-controlled data structure), and an entity that provides invalid security credentials is conventionally granted no access to the dataset (e.g., granted no access to any of the information that is contained within the encrypted and/or otherwise access-controlled data structure). The inventors of various embodiments of the invention recognized that such conventional techniques can be problematic when it is desired to share different subsets of a dataset with different entities. Specifically, different entities might have different levels of authorization (e.g., different security clearances). Thus, it can be desired to prevent such different entities from accessing different portions of the dataset.

For example, suppose that a dataset can be decomposed into a first subset, a second subset, and a third subset, where any suitable combinations of such subsets can have zero and/or non-zero intersections. Suppose, further, that it is desired to share only the first subset with a first entity, to share only the second subset with a second entity, and to share only the third subset with a third entity. In other words, it is desired that none of the three entities in this example be permitted to have access to the entire dataset.

This cannot be conventionally accomplished by creating a single encrypted and/or otherwise access-controlled data structure that contains the entire dataset. This is because, as mentioned above, any entity that provides valid security credentials to such a single encrypted and/or otherwise access-controlled data structure would be granted access to the entire dataset (e.g., granted access to all of the information that is stored within the single encrypted and/or otherwise access-controlled data structure).

Instead, such sharing is conventionally accomplished by creating three separate encrypted and/or otherwise access-controlled data structures, where a first encrypted and/or otherwise access-controlled data structure contains only the first subset, where a second encrypted and/or otherwise access-controlled data structure contains only the second subset, and where a third encrypted and/or otherwise access-controlled data structure contains only the third subset. In such case, security credentials issued to the first entity can be valid for the first encrypted and/or otherwise access-controlled data structure but invalid for the second and third data structures. Similarly, security credentials issued to the second entity can be valid for the second encrypted and/or otherwise access-controlled data structure but invalid for the first and third data structures. Likewise, security credentials issued to the third entity can be valid for the third encrypted and/or otherwise access-controlled data structure and invalid for the first and second data structures.

In this way, the first entity can access the first data structure but not the second or third data structures. Accordingly, the first entity can have access to the first subset (e.g., all of the information contained within the first encrypted and/or otherwise access-controlled data structure) but cannot have access to the second or third subsets (e.g., not contained within the first encrypted and/or otherwise access-controlled data structure). Similarly, the second entity can access the second data structure but not the first or third data structures. Thus, the second entity can have access to the second subset (e.g., all of the information contained within the second encrypted and/or otherwise access-controlled data structure) but cannot have access to the first or third subsets (e.g., not contained within the second encrypted and/or otherwise access-controlled data structure). Likewise, the third entity can access the third data structure but not the first or second data structures. Thus, the third entity can have access to the third subset (e.g., all of the information contained within the third encrypted and/or otherwise access-controlled data structure) but cannot have access to the first or second subsets (e.g., not contained within the third encrypted and/or otherwise access-controlled data structure).

The inventors of various embodiments of the invention recognized that such conventional techniques are computationally expensive. Specifically, such conventional techniques involve replicating the original dataset and/or portions of the original dataset, so as to generate and store different versions of the original dataset. This is disadvantageous because it consumes excessive amounts of computer memory, especially for high-volume datasets. Moreover, such conventional techniques involve duplicating encryption and/or access-control overhead costs. Specifically, when different versions of the original dataset are generated and stored, such different versions are separately encrypted and/or otherwise protected, so as to promote access-control. This is disadvantageous because the process of encryption and/or the process of implementing other access-control techniques consumes excessive time and computational resources, especially when it is desired to share the original dataset with many different entities having many different authorization levels, in which case many different secured versions of the original dataset would be needed. Accordingly, systems and/or techniques that can ameliorate one or more of these technical problems can be desired.

Various embodiments of the invention can address one or more of these technical problems. Specifically, various embodiments of the invention can provide systems and/or techniques that can facilitate policy-driven views of datasets. In various aspects, embodiments of the invention can be considered as a computerized tool (e.g., computer-implemented software) that can electronically receive and/or otherwise electronically access a dataset that can be provided by a data owner. In various instances, the computerized tool can electronically write and/or otherwise electronically store the dataset in any suitable centralized and/or decentralized data structure. In various cases, the computerized tool can encrypt and/or apply other access-control measures to the dataset.

In various aspects, the data owner can desire to share different subsets of the dataset with different entities. Such sharing would be conventionally accomplished by separately writing and/or encrypting different versions of the dataset for each different entity. However, as explained above, such a conventional technique excessively consumes computational resources and time, especially as the volume of the dataset and/or the number of entities grow. Instead, the computerized tool described herein can avoid having to separately write and/or encrypt different versions of the dataset by defining, based on electronic input from the data owner, a view policy.

In various cases, the view policy can govern how the computerized tool executes read operations on the dataset. Specifically, the view policy can respectively correlate and/or otherwise map different security credentials to different view instructions. In various cases, a view instruction can be any suitable type of electronic information that specifies which entries of the dataset to acquire upon executing a read operation and/or that specifies how such entries should be presented upon executing a read operation. In various instances, when an entity provides a security credential to the computerized tool, the computerized tool can leverage the view policy to identify a view instruction that is respectively correlated and/or otherwise mapped to the inputted security credential. Accordingly, the computerized tool can execute a read operation on the dataset in accordance with the identified view instruction. In other words, based on input from the data owner, the computerized tool can electronically generate a different security credential for each entity that the data owner desires to share different portions of the dataset with, and, for each security credential, the computerized tool can electronically generate a view instruction that indicates what subset of the dataset to read upon executing a read operation and/or how such subset should be presented upon executing a read operation.

For example, consider a dataset that comprises four rows of entries: row 1, row 2, row 3, and row 4. Suppose that the data owner desires to share the first three rows (e.g., row 1, row 2, and row 3) of the dataset with an entity A and desires to share the last two rows (e.g., row 3 and row 4) with an entity B. When conventional techniques are applied, two separate encrypted data structures are generated: a first encrypted data structure that contains row 1, row 2, and row 3 and that does not contain row 4, and a second encrypted data structure that contains row 3 and row 4 and that contains neither row 1 nor row 2. Accordingly, the data owner can issue a security credential that is valid for the first encrypted data structure to the entity A and not to the entity B, and the data owner can issue a different security credential that is valid for the second encrypted data structure to the entity B and not to the entity A. Thus, the entity A can access only the first encrypted data structure (e.g., containing row 1, row 2, and row 3), and the entity B can access only the second encrypted data structure (e.g., containing row 3 and row 4). Although this conventional technique shares the dataset with the entity A and the entity B as desired by the data owner, it wastes computational resources. Specifically, row 3 is written/stored twice which wastes computer memory, and, in this example, two data structures require encryption rather than just one data structure, which wastes computing time and processing power.

In stark contrast, various embodiments of the computerized tool described herein can share the dataset with the entity A and the entity B as desired by the data owner without such waste of computational resources. This can be accomplished via a view policy as described herein. Specifically, the computerized tool can electronically receive the dataset from the data owner and can encrypt and/or otherwise protect the dataset via any suitable access-control technique. In various cases, the data owner can specify that a first security credential is needed which permits the reading of only row 1, row 2, and row 3, and can specify that a second security credential is needed which permits the reading of only row 3 and row 4. Accordingly, the computerized tool can electronically generate, via any suitable cryptographic technique, a security credential A that is correlated and/or otherwise mapped to a view instruction A, and the computerized tool can electronically generate a security credential B that is correlated and/or otherwise mapped to a view instruction B. In various cases, the view instruction A can specify and/or otherwise indicate that only row 1, row 2, and row 3 are to be acquired upon the execution of a read operation, and the view instruction B can specify and/or otherwise indicate that only row 3 and row 4 are to be acquired upon the execution of a read operation. Furthermore, the computerized tool can, in various cases, securely issue and/or otherwise privately convey via any suitable technique the security credential A to the entity A, and can likewise securely issue and/or otherwise privately convey via any suitable technique the security credential B to the entity B.

So, when the entity A desires to read the dataset, the entity A can input the security credential A into the computerized tool, the computerized tool can determine that the security credential A corresponds to the view instruction A, and the computerized tool can execute a read operation on the dataset in accordance with the view instruction A. That is, when the security credential A is inputted, the computerized tool can read only row 1, row 2, and row 3 of the dataset and can refrain from reading row 4 of the dataset, as specified by the view instruction A. In this way, row 4 is not shared with the entity A. Similarly, when the entity B desires to read the dataset, the entity B can input the security credential B into the computerized tool, the computerized tool can determine that the security credential B corresponds to the view instruction B, and the computerized tool can execute a read operation on the dataset in accordance with the view instruction B. That is, when the security credential B is inputted, the computerized tool can read only row 3 and row 4 of the dataset and can refrain from reading row 1 and row 2 of the dataset, as specified by the view instruction B. In this way, row 1 and row 2 are not shared with the entity B. Therefore, the dataset can be selectively shared with the entity A and the entity B as desired by the data owner.

Note that the computerized tool can facilitate such sharing without writing and/or otherwise electronically storing separate versions of the dataset, and thus without separately encrypting and/or otherwise access-controlling such separate versions of the dataset. Instead, the computerized tool can facilitate such sharing by writing/storing the dataset once, and by executing customized, tailored, and/or selective read operations on the dataset based on a view policy; that is, based on a mapping of security credentials to view instructions. Specifically, in the above example, conventional techniques result in the duplicative storing of row 3 and require two separate encryptions, whereas various embodiments of the invention can avoid such duplicative storing of row 3 and can implement one encryption. In this way, the computerized tool can avoid the excessive consumption of computational resources that plagues conventional techniques (e.g., writing and encrypting the dataset one time as opposed to several times, and reading the dataset differently based on the inputted security credentials).

Various embodiments of the invention can be employed to use hardware and/or software to solve problems that are highly technical in nature (e.g., to facilitate policy-driven views of datasets), that are not abstract and that cannot be performed as a set of mental acts by a human. Further, some of the processes performed can be performed by a specialized computer (e.g., accessing a dataset, respectively correlating a set of security credentials to a set of view instructions associated with the dataset, receiving as input a first security credential that is listed in the set of security credentials, identifying a first view instruction that is listed in the set of view instructions, wherein the first view instruction is respectively correlated to the first security credential, and generating as output a view of the dataset based on the first view instruction). Such defined tasks are not typically performed manually by humans. Moreover, neither the human mind nor a human with pen and paper can electronically access a dataset, electronically correlate a set of security credentials with a set of view instructions, and electronically execute a read operation on the dataset based on one of the set of view instructions. Instead, various embodiments of the invention are inherently and inextricably tied to computer technology and cannot be implemented outside of a computing environment (e.g., electronically-stored datasets are inherently computerized objects that cannot exist outside of computing systems; likewise, a computerized tool that facilitates selective sharing/reading of such electronically-stored datasets based on view policies is also an inherently computerized device that cannot be practicably implemented in any sensible way without computers).

In various instances, embodiments of the invention can integrate into a practical application the disclosed teachings regarding policy-driven views of datasets. Indeed, as described herein, various embodiments of the invention, which can take the form of systems and/or computer-implemented methods, can be considered as a computerized tool that facilitates sharing of different portions of a dataset with different entities having different levels of authorization, with reduced consumption of computational resources. As explained above, if a data owner desires to share different portions of an encrypted dataset with different entities, conventional techniques accomplish this by generating different encrypted versions of the dataset (e.g., one encrypted version for each different entity and/or for each different class of entities). Writing/storing such different versions of the dataset takes up much computer memory, especially as the size of the dataset increases. Moreover, encrypting such different versions of the dataset takes up much processing power and time, especially as the number of different entities and/or number of different entity classes increases. In stark contrast, embodiments of the invention can facilitate such sharing without excessively consuming computational resources. Specifically, various embodiments of the invention can electronically receive and/or encrypt the dataset (e.g., a single access-controlled version of the dataset), and various embodiments of the invention can correlate a set of security credentials to a set of view instructions, where a view instruction indicates and/or otherwise specifies which entries of the dataset should be acquired and/or not acquired during a read operation. In various cases, when a security credential is inputted by an entity desiring to read the dataset, embodiments of the invention can identify a view instruction that is correlated with the inputted security credential and can execute a read operation on the dataset in accordance with the identified view instruction. In this way, different portions of the dataset can be read/accessed by different entities, without repetitively writing and/or encrypting the dataset. That is, various embodiments of the invention can grant different entities access to different portions of the dataset, while consuming fewer computational resources as compared to conventional techniques. In other words, embodiments of the invention can improve the very performance of computing systems (e.g., can reduce waste of computational resources). Systems and/or techniques that can grant different entities access to different portions of the dataset with reduced expenditure of computational resources clearly constitute a concrete and tangible technical improvement in the field of dataset access-control.

Furthermore, various embodiments of the invention can control tangible, hardware-based, and/or software-based devices based on the disclosed teachings. For example, embodiments of the invention can display and/or render, on tangible computer monitors/screens, results of read operations in accordance with view policies.

It should be appreciated that the figures and the herein disclosure describe non-limiting examples of various embodiments of the invention.

FIG. 1 illustrates a block diagram of an example, non-limiting system 100 that can facilitate policy-driven views of datasets in accordance with one or more embodiments described herein. As shown, a policy-driven view system 102 can be operatively coupled, via any suitable wired and/or wireless electronic connections, to an operator device 104 and/or to a set of user devices 106 (e.g., user device 1 to user device n for any suitable positive integer n). In various instances, the operator device 104 can be associated with and/or controlled by a data owner (e.g., whether human, machine, and/or otherwise). Similarly, the set of user devices 106 can be associated with and/or controlled by a set of users (e.g., user device 1 can be associated with and/or controlled by a user 1 (whether human, machine, and/or otherwise), and the user device n can be associated with and/or controlled by a user n (whether human, machine, and/or otherwise)). In various cases, the operator device 104 can be any suitable combination of computer hardware and/or computer software (e.g., desktop computer, laptop computer, smart phone, tablet, personal digital assistant, vehicle-integrated computer). Likewise, each user device in the set of user devices 106 can be any suitable combination of computer hardware and/or computer software. In various instances, the data owner can desire to securely and/or privately share different subsets of a dataset with different users of the set of users. In various aspects, this can be facilitated by the policy-driven view system 102, as described herein.

In various embodiments, the policy-driven view system 102 can comprise a processor 108 (e.g., computer processing unit, microprocessor) and a computer-readable memory 110 that is operably connected to the processor 108. The memory 110 can store computer-executable instructions which, upon execution by the processor 108, can cause the processor 108 and/or other components of the policy-driven view system 102 (e.g., data component 112, view policy component 114, input component 116, output component 118) to perform one or more acts. In various embodiments, the memory 110 can store computer-executable components (e.g., data component 112, view policy component 114, input component 116, output component 118), and the processor 108 can execute the computer-executable components.

In various embodiments, the policy-driven view system 102 can comprise a data component 112. In various aspects, the data component 112 can electronically receive from the operator device 104, and/or can otherwise electronically access, the dataset that the data owner desires to securely and/or privately share with the set of users. In other words, the operator device 104 can electronically provide, via any suitable data communication technique, the dataset to the data component 112. In various instances, the data component 112 can electronically write/store the dataset to memory, and the data component 112 can electronically encrypt the dataset via any suitable cryptographic technique and/or can otherwise apply any suitable access-control measures to the dataset. Thus, in order for any of the set of user devices 106 to read and/or otherwise access the dataset, such user device would first need to provide valid security credentials (e.g., user identifier and/or password) to the policy-driven view system 102. In various cases, without providing valid security credentials, none of the set of user devices 106 can read and/or otherwise access the dataset encrypted by the data component 112.

In various embodiments, the policy-driven view system 102 can comprise a view policy component 114. As mentioned above, the data owner can desire to securely and/or privately share different subsets of the dataset with different users of the set of users (e.g., the data owner can desire to share only a subset 1 of the dataset with the user 1, and the data owner can desire to share only a subset n of the dataset with the user n). To this end, the operator device 104 can, in various aspects, electronically transmit and/or otherwise electronically communicate to the view policy component 114 a set of view instructions that correspond to the set of users (e.g., a view instruction 1 for the user 1, and a view instruction n for the user n). In various aspects, a view instruction can be any suitable type of electronic information that specifies a subset of the dataset that is to be readable and/or not readable to a given user. In other words, a view instruction can indicate which entries of the dataset are permitted to be acquired during the execution of a read operation on the dataset and/or can indicate which entries of the dataset are not permitted to be acquired during the execution of a read operation on the dataset. Thus, in various aspects, a view instruction can be considered as a specification of reading privileges and/or access rights for a given user.

In some cases, a view instruction can further specify transformations that are to be applied to read results after and/or during the execution of a read operation on the dataset. That is, a view instruction can indicate that when a particular entry of the dataset is read during execution of a read operation, the read result is to be modified and/or altered in a particular way prior to presentation and/or rendering of the read result. In such cases, the particular entry of the dataset can be not rewritten and/or overwritten by such transformation; instead, the underlying data entry can be read without modification, and the read result can be transformed.

In various aspects, once the operator device 104 provides the set of view instructions, the view policy component 114 can electronically generate, via any suitable cryptographic techniques, a set of security credentials that respectively correspond to the set of view instructions. That is, for each view instruction, the view policy component 114 can electronically create a unique security credential (e.g., a unique user identifier and/or password). In still other words, the view policy component 114 can respectively correlate, map, and/or otherwise link the set of security credentials to the set of view instructions (e.g., a security credential 1 correlated with the view instruction 1, and a security credential n correlated with the view instruction n). In various aspects, once the set of security credentials are generated, the view policy component 114 can electronically transmit the set of security credentials to the set of user devices 106 (e.g., can securely share the security credential 1 with the user device 1 and thus with the user 1, and can securely share the security credential n with the user device n and thus with the user n). In various aspects, any user in the set of users can thus provide their corresponding security credential to the policy-driven view system 102 in order to read authorized entries of the dataset encrypted by the data component 112.

In various embodiments, the policy-driven view system 102 can comprise an input component 116. In various aspects, the input component 116 can electronically receive as input a security credential from a user device of the set of user devices 106. In other words, when a particular user of the set of users desires to read and/or otherwise access the dataset encrypted by the data component 112, that particular user can electronically provide, via their corresponding user device of the set of user devices 106, their corresponding security credential to the input component 116.

In various embodiments, the policy-driven view system 102 can comprise an output component 118. In various aspects, the output component 118 can electronically identify a view instruction that is respectively correlated to the inputted security credential. In other words, when a particular user provides their particular security credential to the input component 116, the output component 118 can determine which view instruction corresponds to that particular security credential and thus to that particular user. In various cases, the output component 118 can electronically generate a view of the dataset encrypted by the data component 112, based on the identified view instruction. In other words, the output component 118 can execute a read operation on the dataset that complies with the identified view instruction. In various aspects, the output component 118 can electronically relay the generated view (e.g., the read result) to the particular user device of the particular user that inputted their security credential.

In this way, a view policy can be implemented to enable a single encrypted dataset to be read and/or accessed differently by different users. In other words, view instructions (e.g., which can also be called read instructions) can be defined so as to customize and/or tailor read operations for different users.

To clarify some of the above discussion, consider the following non-limiting example. Suppose that the dataset is structured as a graph having five nodes: node 1, node 2, node 3, node 4, and node 5. Furthermore, suppose that the data owner desires to securely share different subsets of the dataset with two users (e.g., n can equal 2 in this example). Specifically, the data owner can desire to securely share only node 1, node 2, and node 5 with a user 1, and the data owner can desire to securely share only node 1, node 3, node 4, and node 5 with a user 2. In such case, the operator device 104 can electronically provide the dataset to the data component 112, and the data component 112 can encrypt and/or otherwise apply access-control measures to the dataset. Furthermore, the operator device 104 can electronically indicate two view instructions to the view policy component 114: a view instruction 1 for user 1 indicating that node 3 and node 4 are not permitted to be acquired during execution of read operations, and a view instruction 2 for user 2 indicating that node 2 is not permitted to be acquired during execution of read operations. Accordingly, the view policy component 114 can electronically generate, in accordance with the encryption and/or access-control measures applied by the data component 112, two security credentials based on these two view instructions: a security credential 1 that corresponds to the view instruction 1, and a security credential 2 that corresponds to the view instruction 2. In various aspects, the view policy component 114 can privately convey the security credential 1 to the user device 1 and the security credential 2 to the user device 2. In other cases, the view policy component 114 can privately convey both the security credential 1 and the security credential 2 to the operator device 104, and the operator device 104 can respectively relay the two security credentials to the user device 1 and the user device 2.

In various instances, when the user 1 desires to read the dataset, the user device 1 can electronically provide the security credential 1 to the input component 116. The output component 118 can determine that the security credential 1 is correlated and/or mapped to the view instruction 1. Accordingly, the output component 118 can generate a view of the dataset that complies with the view instruction 1. In other words, the output component 118 can read the dataset as stipulated by the view instruction 1. Since the view instruction 1 indicates that read operations are not permitted to acquire the node 3 and the node 4, the output component 118 can read only the node 1, the node 2, and the node 5 when the security credential 1 is provided. Thus, the output component 118 can electronically convey to the user device 1 the read results of the node 1, the node 2, and the node 5.

In various aspects, when the user 2 desires to read the dataset, the user device 2 can electronically provide the security credential 2 to the input component 116. The output component 118 can determine that the security credential 2 is correlated and/or mapped to the view instruction 2. Accordingly, the output component 118 can generate a view of the dataset that complies with the view instruction 2. In other words, the output component 118 can read the dataset as stipulated by the view instruction 2. Since the view instruction 2 indicates that read operations are not permitted to acquire the node 2, the output component 118 can read only the node 1, the node 3, the node 4, and the node 5 when the security credential 2 is provided. Thus, the output component 118 can electronically convey to the user device 2 the read results of the node 1, the node 3, the node 4, and the node 5.

As shown by this non-limiting example, the policy-driven view system 102 can write and/or encrypt a single version of the dataset provided by the operator device 104, and the policy-driven view system 102 can generate a view policy, based on input from the operator device 104, that governs how different user devices of the set of user devices 106 are permitted to read the dataset. In other words, different users with different access rights can be prevented from reading/accessing different subsets of the dataset, without repetitively storing and/or repetitively encrypting the dataset (e.g., in the above example, the dataset is stored and/or encrypted once, and the view policy specifies how different users are permitted to read the dataset; different encrypted copies/versions of the dataset are not generated). This reduces the expenditure of computational resources, which is a concrete and tangible technical improvement.

Figure 2:
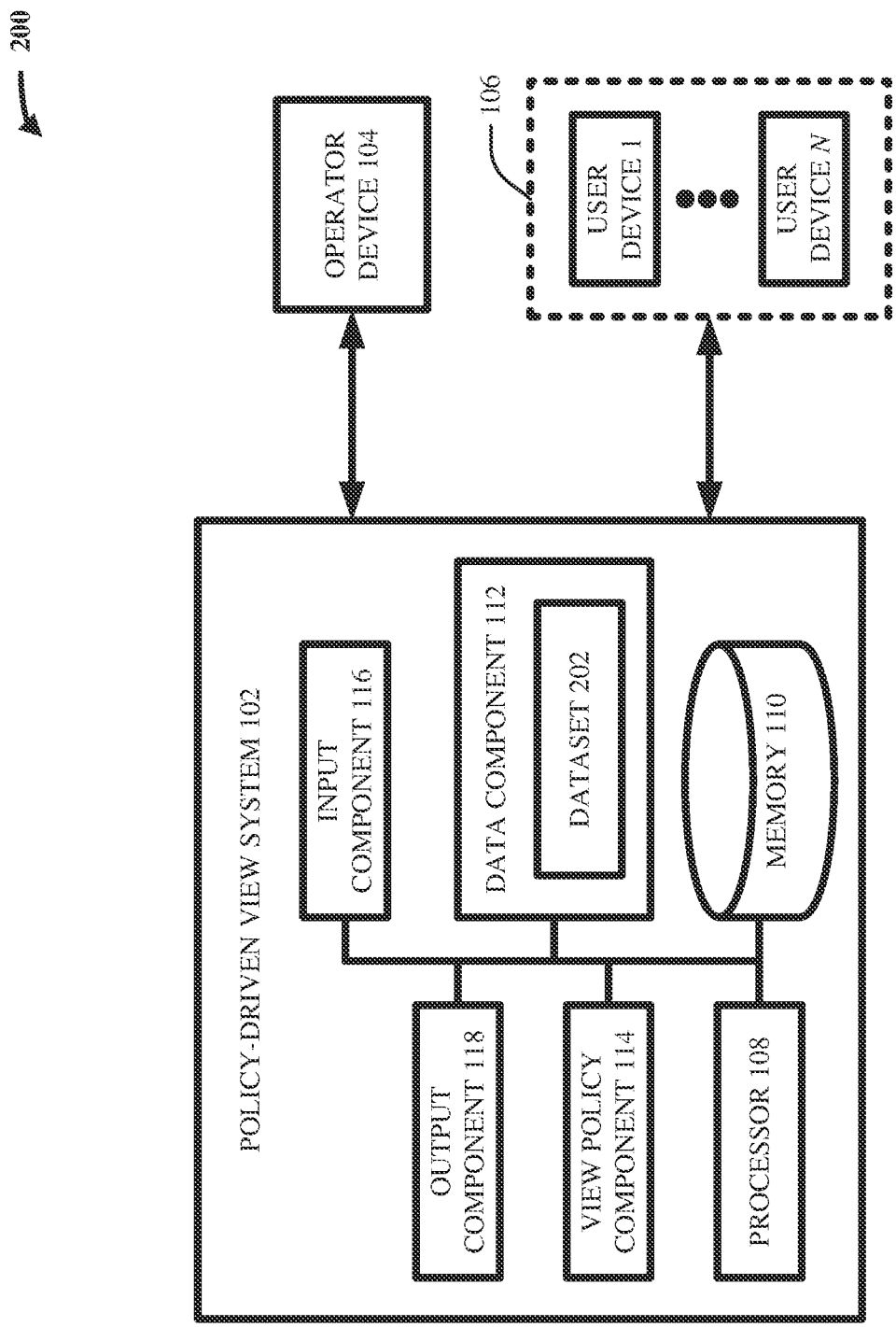
FIG. 2 illustrates a block diagram of an example, non-limiting system including a dataset that facilitates policy-driven views of datasets in accordance with one or more embodiments described herein.

FIG. 2 illustrates a block diagram of an example, non-limiting system 200 including a dataset that can facilitate policy-driven views of datasets in accordance with one or more embodiments described herein. As shown, the system 200 can, in some cases, comprise the same components as the system 100, and can further comprise a dataset 202.

In various embodiments, the data component 112 can electronically receive the dataset 202 from the operator device 104 and/or from any other suitable database that is electronically accessible to the data component 112. In various instances, the dataset 202 can be any suitable collection of information that the data owner desires to securely and/or privately share with the set of users. In various cases, the dataset 202 can exhibit any suitable data structure. For example, in some cases, the dataset 202 can be relational and/or otherwise tabular in structure (e.g., can comprise rows and/or columns of data entries). In other cases, the dataset 202 can exhibit a graph structure (e.g., can comprise nodes and/or connections between nodes). In still other cases, the dataset 202 can exhibit any suitable hybrid data structure.

In various aspects, the data owner can desire to share different subsets of the dataset 202 with different users of the set of users. For example, the data owner can desire to share a subset 1 of the dataset 202 with the user 1 and can desire to share a subset n of the dataset 202 with the user n. In other words, the data owner can desire to permit the user 1 (e.g., and/or the user device 1) to access and/or read only the subset 1 and not the entire dataset 202. Similarly, the data owner can desire to permit the user n (e.g., and/or the user device n) to access and/or read only the subset n and not the entire dataset 202. In various instances, a subset of the dataset 202 can comprise fewer than all the data entries (e.g., fewer than all rows and/or columns, fewer than all nodes and/or connections) that are included in the dataset 202 (e.g., a subset can sometimes be a strict subset). In various other instances, a subset of the dataset 202 can, in some cases, comprise all the data entries (e.g., all the rows and/or columns, all the nodes and/or connections) that are included in the dataset 202 (e.g., a subset can sometimes not be a strict subset). In various aspects, any of the subset 1 to the subset n can be intersecting and/or non-intersecting. In other words, any two subsets can have overlapping contents and/or can have non-overlapping contents, depending on the desires of the data owner.

In various embodiments, the data component 112 can encrypt the dataset 202 via any suitable encryption technique. For example, the data component 112 can implement attribute-based encryption, such as Key-Policy Attributed Based Encryption (EP-ABE) schemas, to regulate electronic access to the dataset 202. In various other embodiments, the data component 112 can implement any other suitable access-control techniques to protect and/or secure the dataset 202. In any case, after encryption and/or access-control of the dataset 202, none of the set of user devices 106 can access and/or read the dataset 202 without first inputting a valid security credential.

Figure 3:
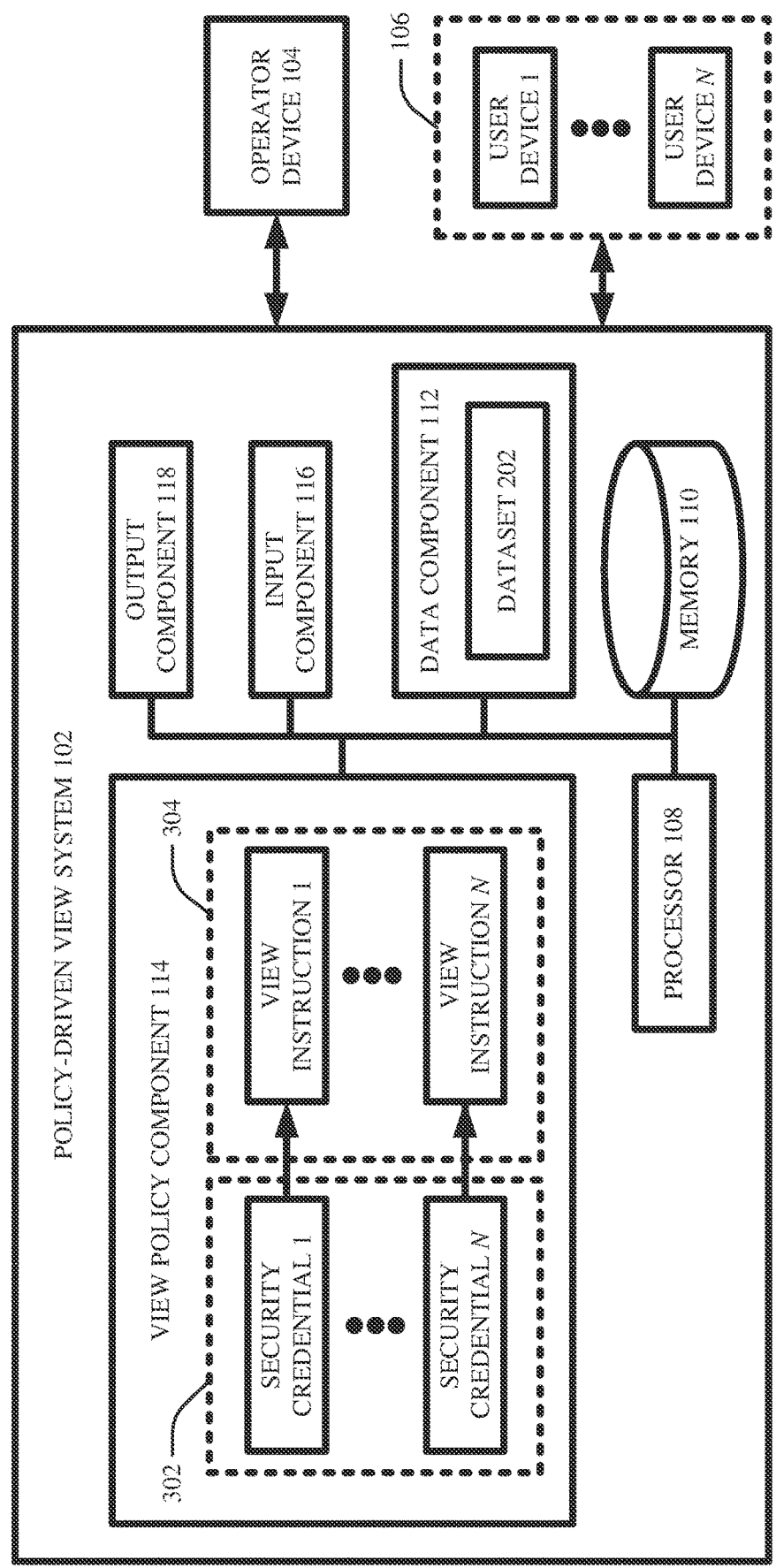
FIG. 3 illustrates a block diagram of an example, non-limiting system including a set of security credentials correlated with a set of view instructions that facilitates policy-driven views of datasets in accordance with one or more embodiments described herein.

FIG. 3 illustrates a block diagram of an example, non-limiting system 300 including a set of security credentials correlated with a set of view instructions that can facilitate policy-driven views of datasets in accordance with one or more embodiments described herein. As shown, the system 300 can, in some cases, comprise the same components as the system 200, and can further comprise a set of security credentials 302 and a set of view instructions 304.

In various aspects, the operator device 104 can electronically provide and/or otherwise electronically indicate to the view policy component 114 the set of view instructions 304. As shown, the set of view instructions 304 can, in some cases, correspond to the set of users and/or the set of user devices 106. That is, for each user with which the data owner desires to share a subset of the dataset 202, the data owner can specify a view instruction corresponding to that user (e.g., a view instruction 1 for the user 1 and/or the user device 1, and/or a view instruction n for the user n and/or the user device n). As mentioned above, a view instruction can be any suitable type of electronic information that specifies and/or otherwise indicates read privileges and/or access rights for a corresponding user. That is, the view instruction 1 can specify and/or indicate which subsets of the dataset 202 are permitted to be read and/or accessed by the user 1 and/or which subsets of the dataset 202 are not permitted to be read and/or accessed by the user 1. Similarly, the view instruction n can specify and/or indicate which subsets of the dataset 202 are permitted to be read and/or accessed by the user n and/or which subsets of the dataset 202 are not permitted to be read and/or accessed by the user n. In some cases, a view instruction can specify and/or otherwise indicate one or more transformations (e.g., mathematical and/or semantic modifications) that are to be applied to read results prior to sharing the read results with a given user. In various instances, a view instruction can specify and/or otherwise indicate any other suitable information pertaining to the rights/privileges of a given user to access the dataset 202, such as editing privileges of the given user. Those having ordinary skill in the art will appreciate that, in some cases, any two view instructions in the set of view instructions 304 can be different and/or not different from each other, depending on the desires of the data owner. That is, in some cases, different users of the set of users can actually be allowed to view the same subsets of the dataset 202, if the data owner permits it.

In various embodiments, the view policy component 114 can electronically generate the set of security credentials 302 based on the set of view instructions 304 and based on the encryption and/or access-control measures which the data component 112 applies to the dataset 202. That is, for each view instruction in the set of view instructions 304 (e.g., and thus for each user device in the set of user devices 106 and/or for each user in the set of users), the view policy component 114 can electronically create a unique security credential by leveraging the encryption and/or access-control techniques that are implemented by the data component 112. For example, if the data component 112 utilizes KP-ABE schemas to encrypt/protect the dataset 202, such KP-ABE schemas can likewise be utilized by the view policy component 114 to generate the set of security credentials 302.

In various instances, the view policy component 114 an be considered as respectively correlating and/or mapping the set of security credentials 302 to the set of view instructions 304 (e.g., a security credential 1 can correspond to the view instruction 1, and a security credential n can correspond to the view instruction n). In various cases, a security credential can be any suitable type of electronic information (e.g., user identifier and/or password) that can be mapped and/or linked to a corresponding view instruction. In various other cases, a security credential can be any suitable type of electronic information in which a corresponding view instruction can be encoded. In any case, each security credential of the set of security credentials 302 can be respectively correlated to a given view instruction of the set of view instructions 304.

In various aspects, the set of security credentials 302 and the set of view instructions 304 can together be considered as a view policy defined by the data owner. In various cases, this view policy can be leveraged to securely grant different levels of access to the dataset 202 to different users. For example, if a user provides the security credential 1, the policy-driven view system 102 can thus infer that the user is the user 1 and can determine that such a user may be granted access to the dataset 202 subject to the constraints specified by the view instruction 1. As another example, if the user instead provides the security credential n, the policy-driven view system 102 can infer that the user is the user n and can determine that such a user may be granted access to the dataset 202 subject to the constraints specified by the view instruction n.

In various aspects, the view policy component 114 can securely and/or privately distribute the set of security credentials 302 to the set of user devices 106 (e.g., to the set of users). For instance, in some cases, the view policy component 114 can electronically transmit the security credential 1 to the user device 1, and can electronically transmit the security credential n to the user device n. In various other cases, the view policy component 114 can electronically transmit the set of security credentials 302 to the operator device 104, and the operator device 104 can privately distribute the set of security credentials 302 to the set of user devices 106.

Figure 4:
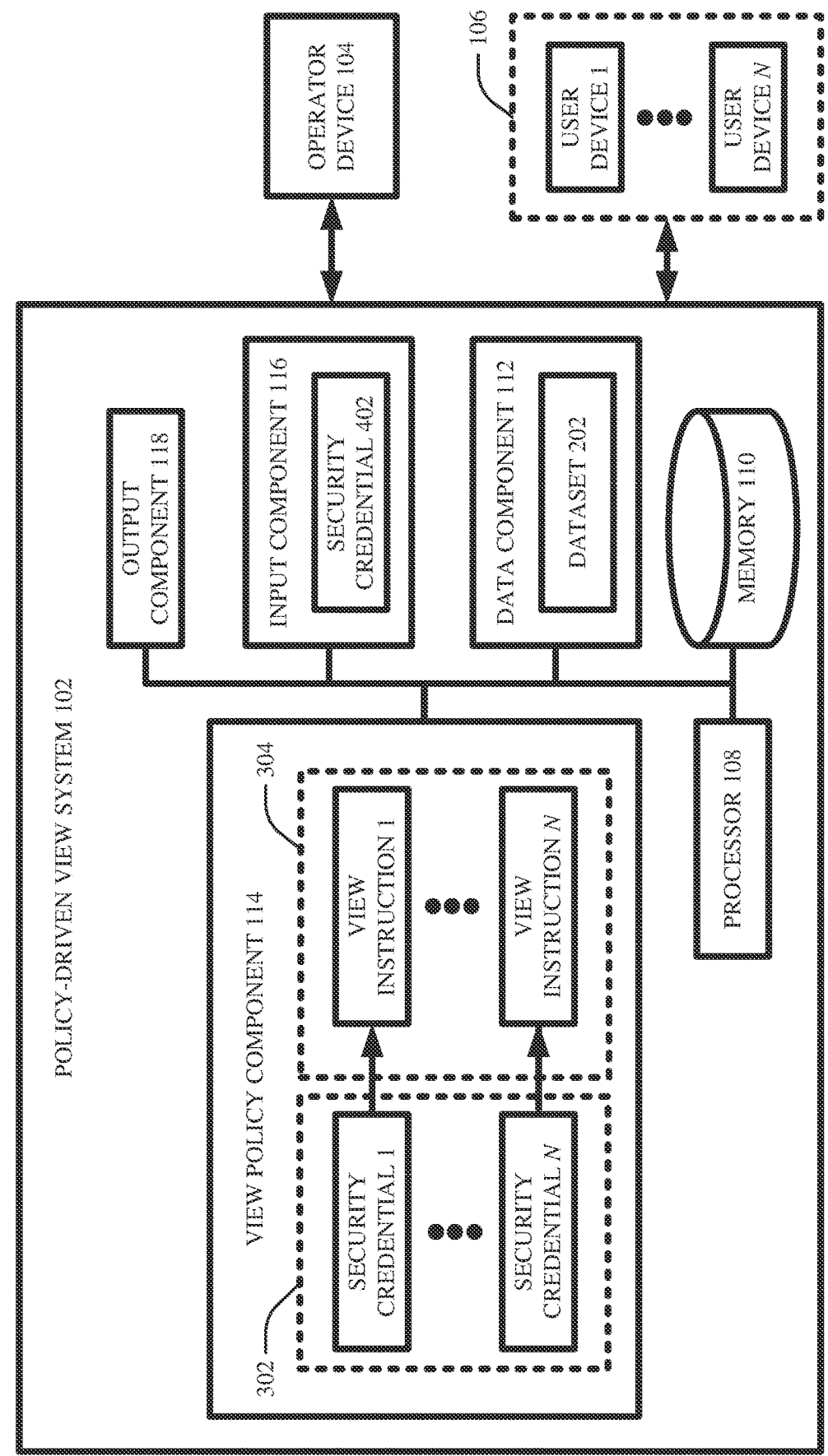
FIG. 4 illustrates a block diagram of an example, non-limiting system including an inputted security credential that facilitates policy-driven views of datasets in accordance with one or more embodiments described herein.

FIG. 4 illustrates a block diagram of an example, non-limiting system 400 including an inputted security credential that can facilitate policy-driven views of datasets in accordance with one or more embodiments described herein. As shown, the system 400 can, in some cases, comprise the same components as the system 300, and can further comprise a security credential 402.

In various embodiments, the input component 116 can electronically receive the security credential 402 from one of the set of user devices 106. In other words, a user from the set of users can desire to read and/or access the dataset 202, and so that user can provide the security credential 402, via their corresponding user device from the set of user devices 106, to the input component 116.

Figure 5:
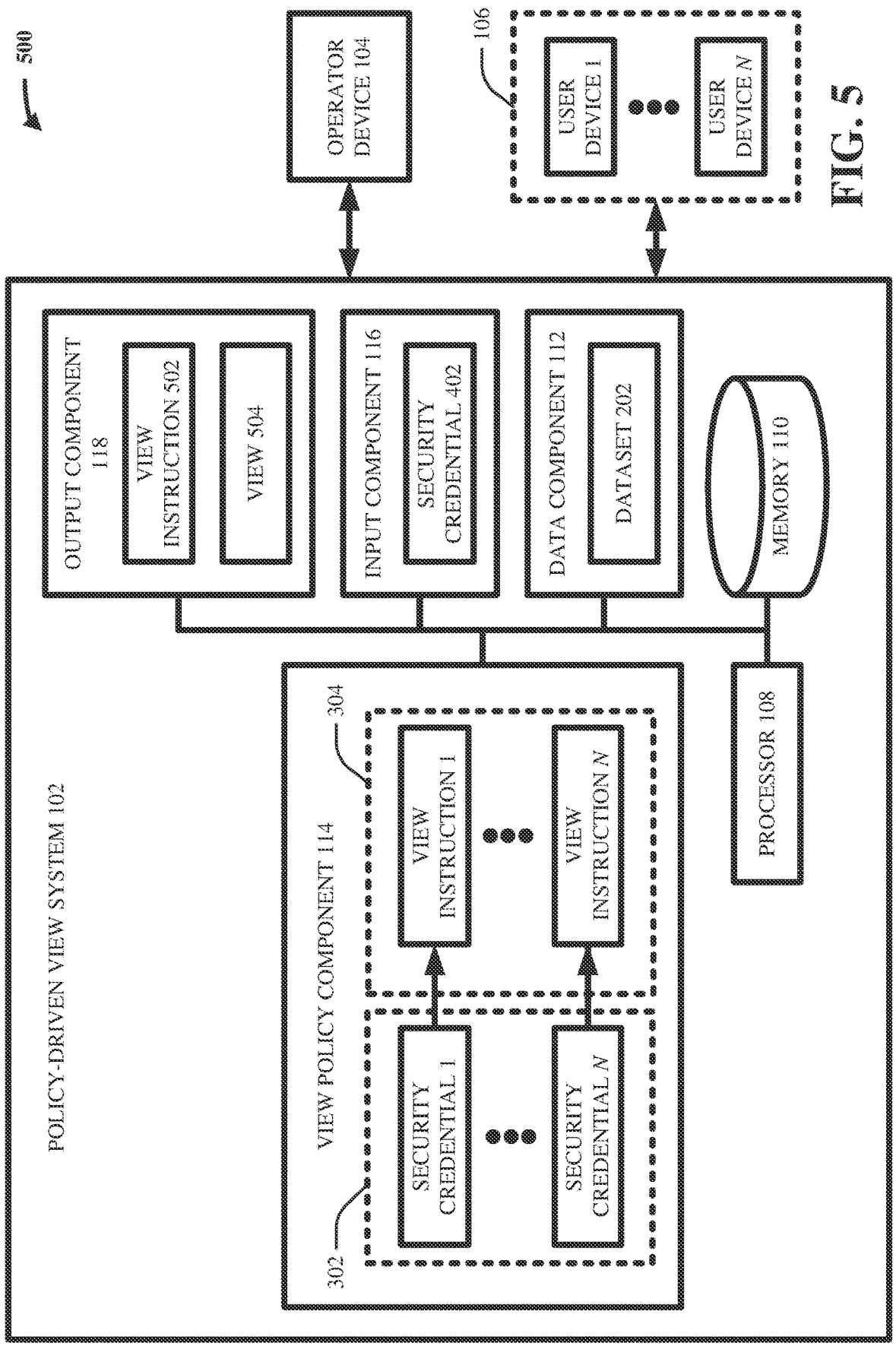
FIG. 5 illustrates a block diagram of an example, non-limiting system including an outputted view that facilitates policy-driven views of datasets in accordance with one or more embodiments described herein.

FIG. 5 illustrates a block diagram of an example, non-limiting system 500 including an outputted view that can facilitate policy-driven views of datasets in accordance with one or more embodiments described herein. As shown, the system 500 can, in some cases, comprise the same components as the system 400, and can further comprise a view instruction 502 and a view 504.

In various embodiments, once the input component 116 electronically receives the security credential 402, the output component 118 can determine whether the security credential 402 is included in the set of security credentials 302. If the security credential 402 is not included in the set of security credentials 302, the output component 118 can determine that the security credential 402 is invalid. In other words, the output component 118 can infer that the user that provided the security credential 402 is not authorized to access the dataset 202 at all. Accordingly, the output component 118 can refrain from performing a read operation on the dataset 202.

In various embodiments, if the security credential 402 is included in the set of security credentials 302, the output component 118 can determine that the security credential 402 is valid. In other words, the output component 118 can infer that the user that provided the security credential 402 is authorized to access, at least in some way, the dataset 202. Upon determining that the security credential 402 is included in the set of security credentials 302, the output component 118 can identify, in the set of view instructions 304, the view instruction that corresponds to the security credential 402. This view instruction can be referred to as the view instruction 502. Thus, the view instruction 502 can specify and/or otherwise indicate the read privileges and/or access rights of the user that provided the security credential 402.

In various aspects, the output component 118 can electronically generate the view 504 based on the view instruction 502. In various aspects, the view 504 can be considered as the result returned by executing a read operation on the dataset 202 according to the view instruction 502. As mentioned above, the view instruction 502 can, in some cases, specify which entries of the dataset 202 are permitted to be acquired during a read operation, and/or can specify mathematical and/or semantic transformations that are to be applied to read results after the execution of a read operation. Thus, the view 504 can include only those entries of the dataset 202 that the user that provided the security credential 402 is authorized to read/access, which authorization is defined by the view instruction 502.

Figure 6:
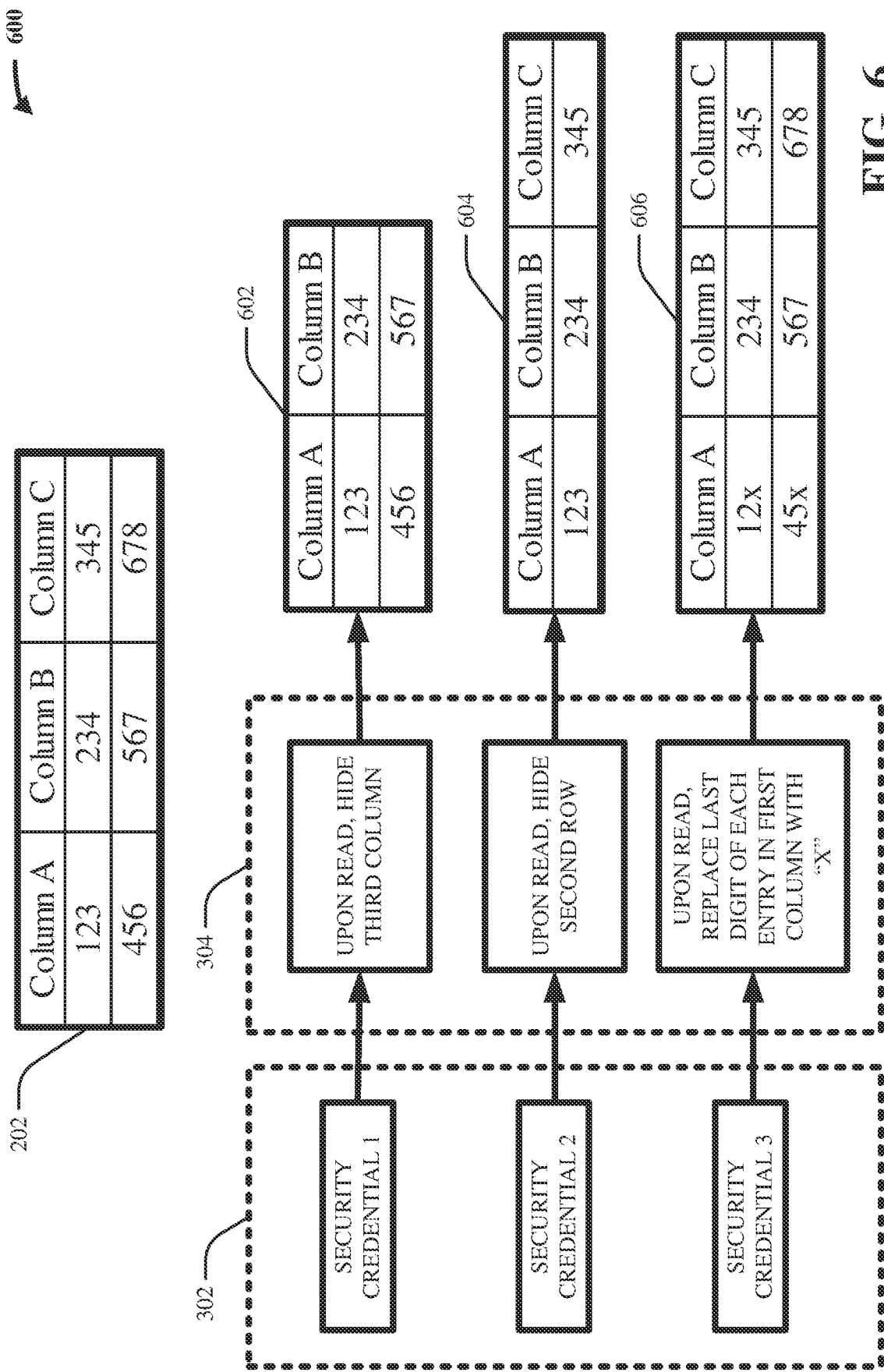
FIG. 6 illustrates example, non-limiting block diagrams demonstrating policy-driven views of datasets in accordance with one or more embodiments described herein.

FIG. 6 illustrates example, non-limiting block diagrams demonstrating policy-driven views of datasets in accordance with one or more embodiments described herein. In other words, FIG. 6 helps to non-limitingly illustrate and thus clarify some of the above discussion.

As shown, FIG. 6 depicts a non-limiting example of the dataset 202. As shown, the dataset 202 can, in some cases, exhibit a relational/tabular structure and can comprise three columns (e.g., column A, column B, and column C), each column having two data entries. Those having ordinary skill in the art will appreciate that this embodiment of the dataset 202 is a non-limiting example shown for the purpose of illustration. In various other embodiments, the dataset 202 can have any other suitable structure, any other suitable number of columns, any other suitable number of rows, and/or any other suitable values for data entries.

As shown, FIG. 6 depicts non-limiting examples of the set of view instructions 304 and of the set of security credentials 302. In this example, the data owner can desire to share different portions of the dataset 202 with three different users: that is, n can equal 3 in this example. In various cases, the data owner can desire that the user 1 be permitted to access/read only the first two columns of the dataset 202, can desire that the user 2 be permitted to access/read only the first row of each column of the dataset 202, and can desire that the user 3 be permitted to access/read all three columns of the dataset 202 with the last digit of each data entry in column A being replaced with an "x". Accordingly, the operator device 104 can provide the set of view instructions 304 so as to reflect such desires. The view policy component 114 can then generate the set of security credentials 302 based on the set of view instructions 304 (e.g., can generate a unique security credential for each view instruction).

The result can be as shown: a security credential 1 can be correlated with a view instruction that specifies that, upon execution of a read operation, the third column should be hidden and/or otherwise not read/acquired; a security credential 2 can be correlated with a view instruction that specifies that, upon execution of a read operation, the second row should be hidden and/or otherwise not read/acquired; and a security credential 3 can be correlated with a view instruction that specifies that, upon execution of a read operation, the last digit of each data entry in the first column should be replaced with "x".

If a user provides/inputs the security credential 1 to the input component 116, the output component 118 can determine that the security credential 1 is not permitted to read/access the column C. Accordingly, the output component 118 can generate the view 602 upon execution of a read operation when the security credential 1 is provided/inputted. In other words, the output component 118 can read only the data entries of column A and column B, and can refrain from reading the data entries in column C, as shown in the view 602.

If a user provides/inputs the security credential 2 to the input component 116, the output component 118 can determine that the security credential 2 is not permitted to read/access the second row of any column. Accordingly, the output component 118 can generate the view 604 upon execution of a read operation when the security credential 2 is provided/inputted. In other words, the output component 118 can read only the data entries that are in the first row of column A, column B, and column C, and can refrain from reading any data entries that are in second row of column A, column B, and column C, as shown in the view 604.

If a user provides/inputs the security credential 3 to the input component 116, the output component 118 can determine that the security credential 3 is permitted to read/access the all three columns but that the read results of data entries in the first column must be transformed replacing their last digits with "x". Accordingly, the output component 118 can generate the view 606 upon execution of a read operation when the security credential 3 is provided/inputted. In other words, the output component 118 can read the data entries in column A, column B, and column C, but cannot present the unaltered read results of data entries in column A. Instead, the output component 118 can first alter/modify the read results of the data entries in column A by replacing each last digit with "x," as shown in the view 606.

Thus, different users can be granted secure access to different portions of the dataset 202 according to the set of view instructions 304. Note that conventional techniques would achieve this result by making three separately encrypted versions of the dataset 202: a first encrypted version that contains only column A and column B; a second encrypted version that contains only the first row of column A, column B, and column C; and a third encrypted version that contains column B, column C, and a transformed column A. But as explained above, this would waste computational resources. Specifically, various data entries would be repetitively stored in computer memory, which wastes storage space (e.g., copies of column B would be written in both the first encrypted version and the third encrypted version, the first entry of column A would be written in both the first encrypted version and the second encrypted version, the first entry of column C would be written in both the second encrypted version and the third encrypted version). Moreover, three separate datasets would be encrypted (e.g., one dataset including only the information shown in view 602, a second dataset including only the information shown in view 604, and a third dataset including only the information shown in view 606) rather than just one dataset, which consumes time and processing power. These problems are exacerbated as the volume of the dataset 202 and/or the number of desired users increases.

In stark contrast, as shown above, various embodiments of the invention can achieve the result desired by the data owner without wasting computational resources. Specifically, the dataset 202 can be written and/or encrypted once (e.g., not three separate times in the above example), and customized read operations can be performed on the dataset 202 as specified by the set of view instructions 304 (e.g., thereby enforcing different read/access restrictions for different users). Thus, various embodiments of the invention can save time and processing power as compared to conventional techniques.

Furthermore, various embodiments of the invention can enhance security of the dataset 202. Specifically, as explained above, the data component 112 can encrypt the dataset 202, thereby providing direct access-control and/or security. However, various embodiments of the invention can also provide indirect access-control/security, because any given security credential included in the set of security credentials 302 can be granted limited access to the dataset 202, as specified by the set of view instructions 304. In other words, if an attacker steals a security credential from an authorized user, the attacker can be able to read/access only that view of the dataset 202 that is permitted by the view instruction corresponding to the stolen security credential; the attacker is thus not able to gain full access to the entire and/or raw dataset 202. This is an additional technical benefit of various embodiments of the invention.

Figure 7:
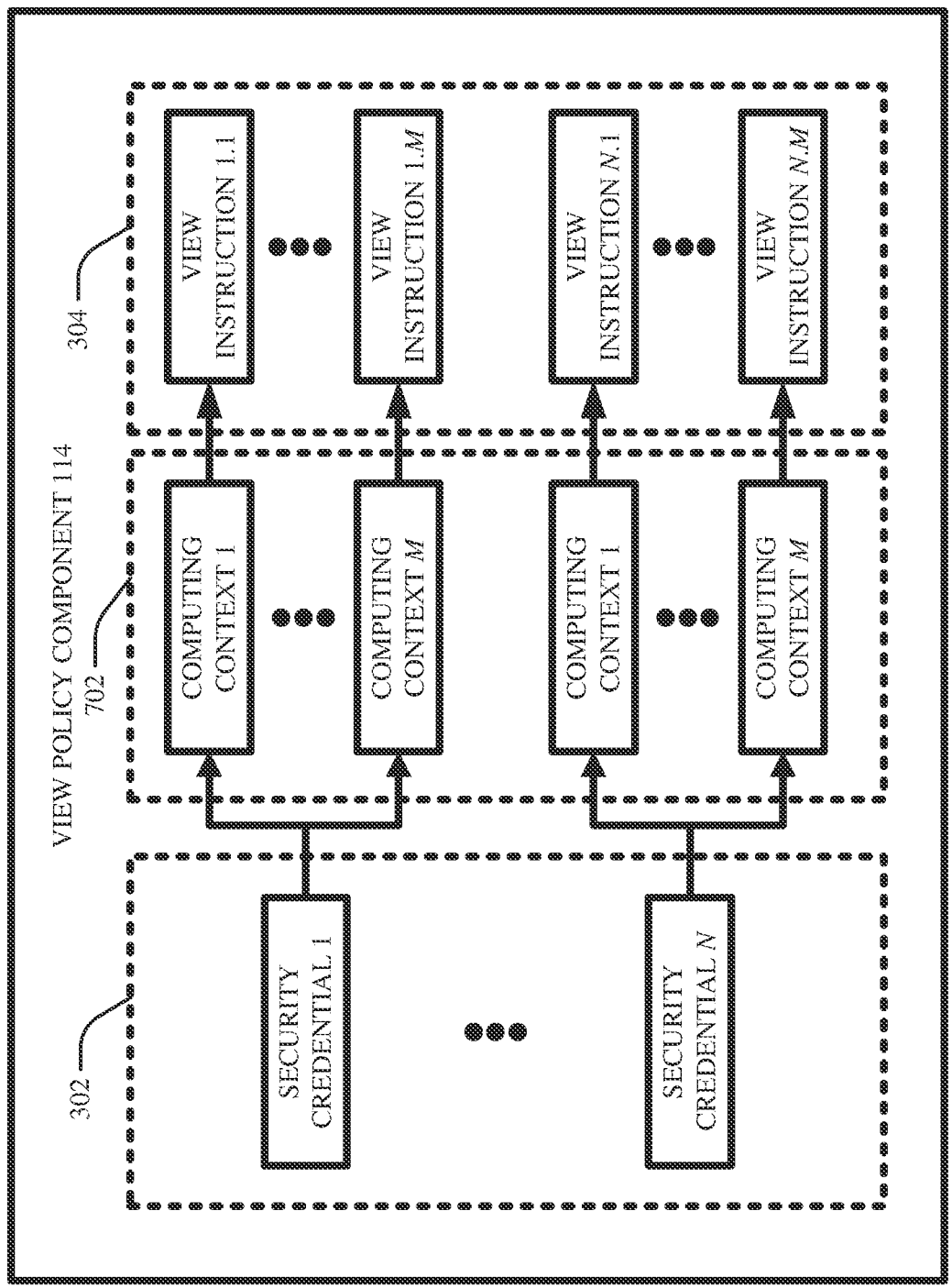
FIG. 7 illustrates a block diagram of an example, non-limiting system including a set of computing contexts that facilitates policy-driven views of datasets in accordance with one or more embodiments described herein.

FIG. 7 illustrates a block diagram of an example, non-limiting system 700 including a set of computing contexts that can facilitate policy-driven views of datasets in accordance with one or more embodiments described herein. As shown, FIG. 7 illustrates a non-limiting example of the view policy component 114.

As explained above, in various aspects, the set of view instructions 304 can be respectively correlated with the set of security credentials 302. That is, when a current user provides the security credential 402 to the input component 116, the view instruction 502 can, in some cases, be determined solely based on the inputted security credential 402. In other cases, however, the set of view instructions 304 can be respectively correlated to both the set of security credentials 302 and to a set of computing contexts 702. In other words, when a current user provides the security credential 402 to the input component 116, the view instruction 502 can, in such cases, be determined not only on the basis on the inputted security credential 402, but also on the basis of a current computing context of the current user.

In various instances, a computing context can be any type of detectable and/or measurable characteristic that is associated with a current user and/or the current user's device that is providing the security credential 402 to the input component 116. For instance, a computing context can be a time and/or date (e.g., year, month, day, hour, minute, second, fraction of a second) at which the current user is providing the security credential 402 to the input component 116. Such a time and/or date can be measured and/or detected by an electronic clock and/or electronic calendar of the current user's device (e.g., one of the set of user devices 106). As another example, a computing context can be a geo-location (e.g., continent, country, state/province, city/town, address, latitude, longitude, elevation) of the current user when the current user is providing the security credential 402 to the input component 116. Such a geo-location can be measured and/or detected by a global positioning sensor in the current user's device. As yet another example, a computing context can be a type of computing device (e.g., desktop computer, laptop computer, smart phone, tablet, personal digital assistant, vehicle-integrated computer) that applies to the current user's device. As still another example, a computing context can be a version of software (e.g., operating system, malware detection system) that the current user's device is implementing.

In various aspects, the set of computing contexts 702 can be electronically defined, specified, and/or otherwise indicated by the operator device 104. Indeed, in some cases, the operator device 104 can define, specify, and/or otherwise indicate the set of computing contexts 702 in conjunction with defining, specifying, and/or otherwise indicating the set of view instructions 304. That is, when the operator device 104 defines a particular view instruction, the operator device 104 can also define a corresponding computing context in which that particular view instruction is deemed to apply.

As explained above, the data owner can desire to share different portions of the dataset 202 with n different entities. In the example shown in FIG. 7, the operator device 104 can define m different computing contexts for any suitable positive integer m. Thus, when computing context is not taken into account, the result can be n different view instructions (e.g., n entities, one view instruction per entity). However, when computing context is taken into account, the result can be nm different view instructions (e.g., n entities, m different computing contexts per entity, and one view instruction per computing context). In other words, a given user with a single security credential can have different read privileges and/or access rights depending on computing context, not just depending on their security credential.

In the example shown, the security credential 1 can be correlated to the computing context 1 which can be correlated to the view instruction 1.1. Similarly, the security credential 1 can also be correlated to the computing context m which can be correlated to the view instruction 1.m. So, when a current user provides the security credential 1 to the input component 116, the input component 116 can infer that the current user is the user 1, and can also electronically capture, measure, and/or otherwise detect a current computing context of the current user. If the current computing context is the computing context 1, the output component 118 can determine that the current user is subject to the view instruction 1.1. On the other hand, if the current computing context is the computing context m, the output component 118 can determine that the current user is instead subject to the view instruction 1.m.

As also shown in FIG. 7, the security credential n can be correlated to the computing context 1 which can be correlated to the view instruction n.1. Similarly, the security credential n can also be correlated to the computing context m which can be correlated to the view instruction n.m. So, when a current user provides the security credential n to the input component 116, the input component 116 can infer that the current user is the user n, and can also electronically capture, measure, and/or otherwise detect a current computing context of the current user. If the current computing context is the computing context 1, the output component 118 can determine that the current user is subject to the view instruction n.1. On the other hand, if the current computing context is the computing context m, the output component 118 can determine that the current user is instead subject to the view instruction n.m.

In this way, a given user can have different read privileges and/or access rights depending on computing context, and not just depending on their security credential.

Figure 8:
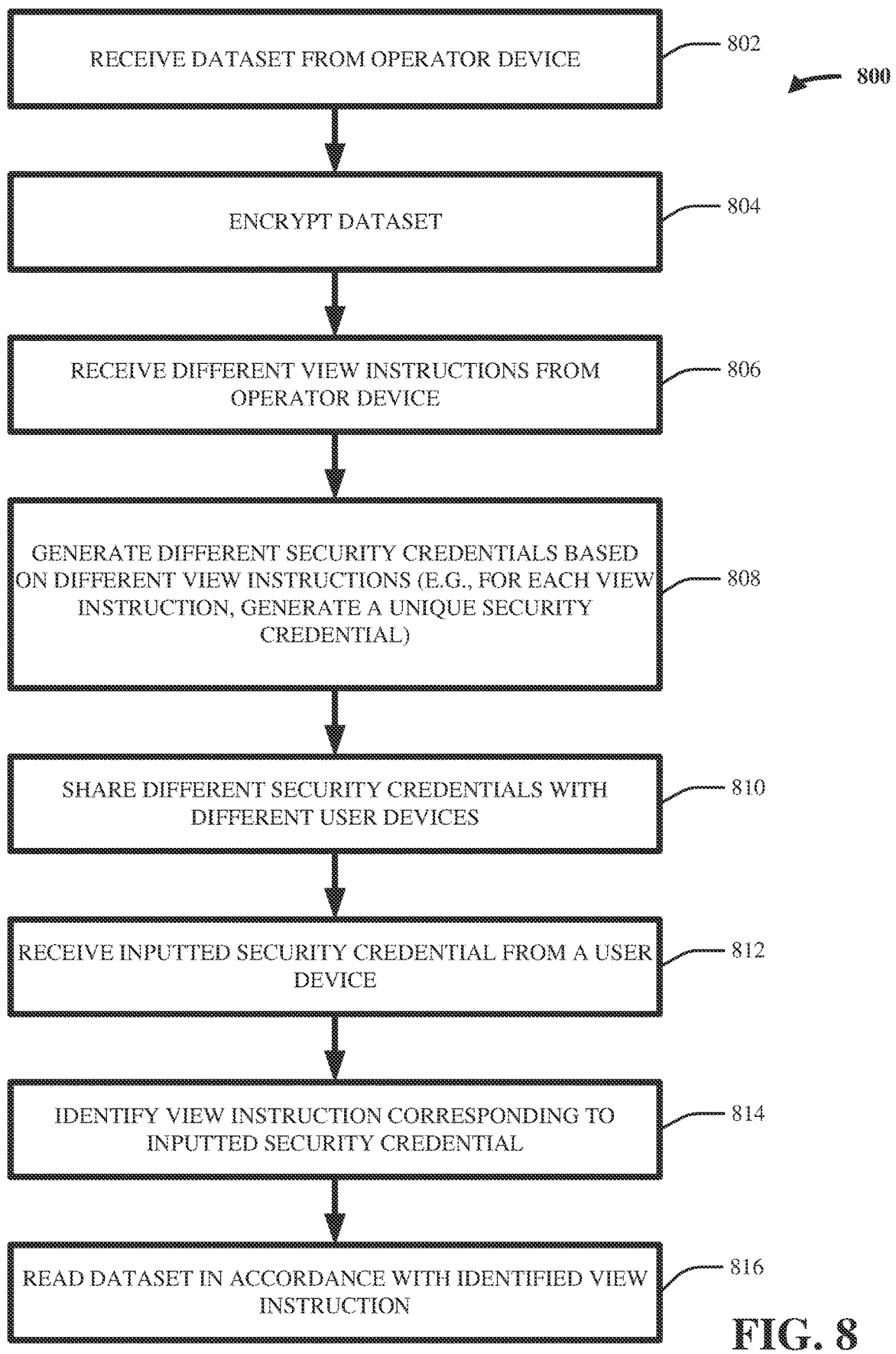
FIG. 8 illustrates a flow diagram of an example, non-limiting computer-implemented method that facilitates policy-driven views of datasets in accordance with one or more embodiments described herein.

FIG. 8 illustrates a flow diagram of an example, non-limiting computer-implemented method 800 that can facilitate policy-driven views of datasets in accordance with one or more embodiments described herein. In various aspects, the computer-implemented method 800 can be performed by the policy-driven view system 102.

In various embodiments, act 802 can include receiving, by a device (e.g., 112) operatively coupled to a processor, a dataset (e.g., 202) from an operator device (e.g., 104).

In various instances, act 804 can include encrypting, by the device (e.g., 112), the dataset.

In various aspects, act 806 can include receiving, by the device (e.g., 114), different view instructions (e.g., 304) from the operator device.

In various cases, act 808 can include generating, by the device (e.g., 114), different security credentials (e.g., 302) based on the different view instructions. For example, for each view instruction, a unique security credential can be created.

In various instances, act 810 can include sharing, by the device (e.g., 114 and/or 104), the different security credentials with different user devices (e.g., 106).

In various aspects, act 812 can include receiving, by the device (e.g., 116), an inputted security credential (e.g., 402) from a user device.

In various cases, act 814 can include identifying, by the device (e.g., 118), a view instruction (e.g., 502) that corresponds to the inputted security credential.

In various instances, act 816 can include reading, by the device (e.g., 118), the dataset in accordance with the identified view instruction.

Although not explicitly shown in FIG. 8, the computer-implemented method 800 can further comprise transmitting, by the device (e.g., 118), any read results to the user device that provided the inputted security credential (e.g., in some cases, the read results can be visually rendered on a computer screen/monitor of the user device).

Figure 9:
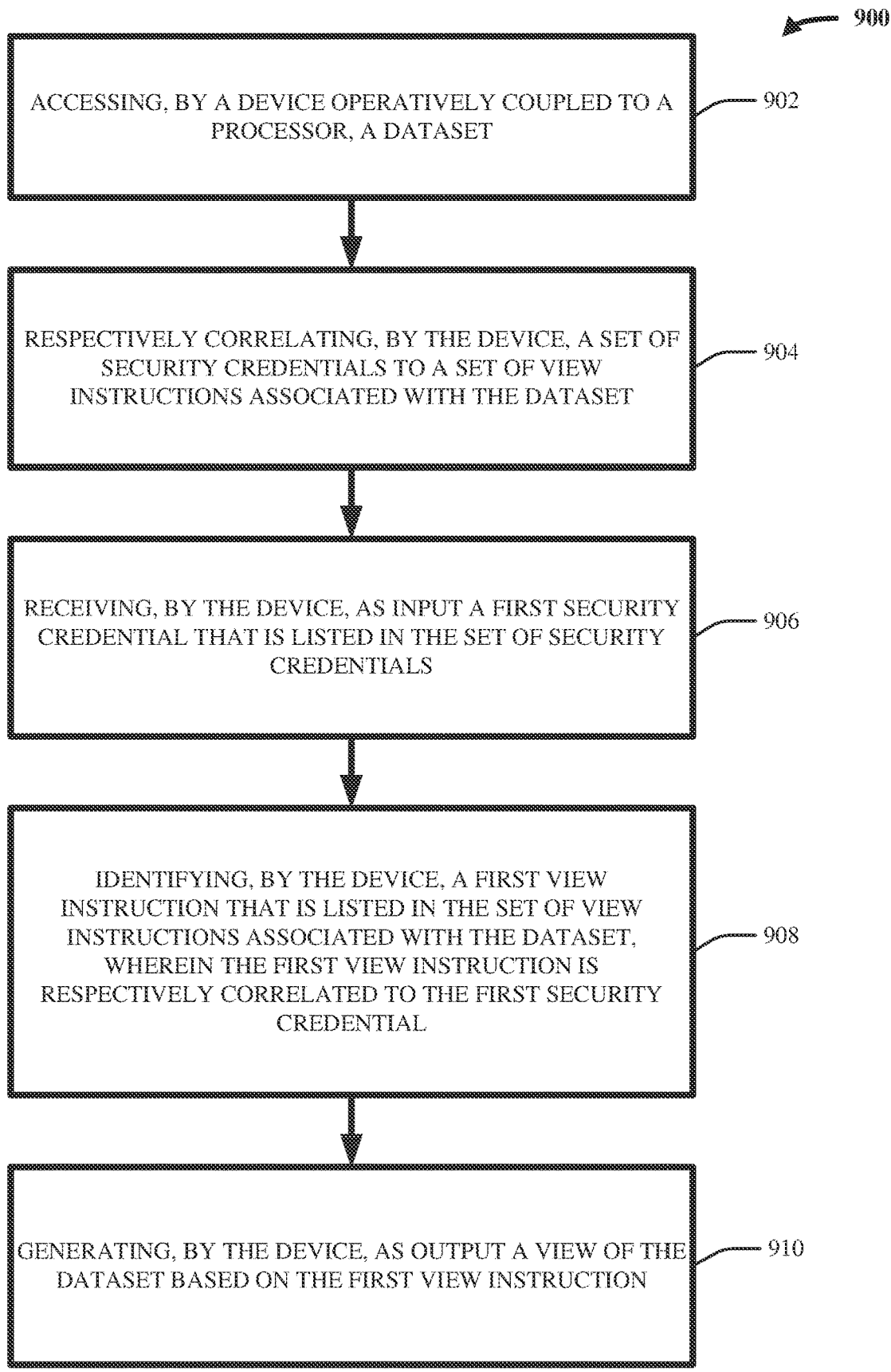
FIG. 9 illustrates a flow diagram of an example, non-limiting computer-implemented method that facilitates policy-driven views of datasets in accordance with one or more embodiments described herein.

FIG. 9 illustrates a flow diagram of an example, non-limiting computer-implemented method 900 that can facilitate policy-driven views of datasets in accordance with one or more embodiments described herein. In various aspects, the computer-implemented method 800 can be performed by the policy-driven view system 102.

In various embodiments, act 902 can include accessing, by a device (e.g., 112) operatively coupled to a processor, a dataset (e.g., 202).

In various instances, act 904 can include respectively correlating, by the device (e.g., 114), a set of security credentials (e.g., 302) to a set of view instructions (e.g., 304) associated with the dataset.

In various aspects, act 906 can include receiving, by the device (e.g., 116), as input a first security credential (e.g., 402) that is listed in the set of security credentials.

In various cases, act 908 can include identifying, by the device (e.g., 118), a first view instruction (e.g., 502) that is listed in the set of view instructions associated with the dataset, wherein the first view instruction is respectively correlated with the first security credential.

In various instances, act 910 can include generating, by the device (e.g., 118), as output a view (e.g., 504, 602, 604, 606) of the dataset based on the first view instruction.

Although not explicitly shown in FIG. 9, the computer-implemented method 900 can further comprise: respectively correlating, by the device (e.g., 114), a set of computing contexts (e.g., 702) to the set of view instructions associated with the dataset; and receiving, by the device (e.g., 116), as input a first computing context (e.g., a current computing context, as explained with respect to FIG. 7) that is listed in the set of computing contexts, wherein the first view instruction is respectively correlated to both the first security credential and the first computing context.

Consider now a brief discussion of a particular embodiment of the invention. In various aspects, embodiments of the invention can be utilized by extending Apache Parquet. Those having ordinary skill in the art will appreciate that Apache Parquet stores data in a collection of data blocks that are organized to increase performance of specific types of queries (e.g., count, average). Furthermore, those having ordinary skill in the art will appreciate that Apache Parquet stores data in read-only and/or append modes. In various cases, Apache Parquet formats data such that a data file includes a metadata block at the beginning of the file. In various cases, the inventors of various embodiments of the invention recognized that this metadata block can be extended (e.g., that additional information can be inserted into the metadata block). Specifically, access to a dataset in Apache Parquet can be regulated, for example, by any suitable attribute-based encryption technique, such as KP-ABE schemas. Thus, those attribute-based encryption techniques can be utilized to define a view policy (e.g., to define the set of view instructions 304 and/or to generate the set of security credentials 302). In various aspects, views of the dataset can be generated in Apache Parquet by using symmetric algorithms, such as Advanced Encryption Standard (AES), which can encrypt blocks of values for each data entry and/or field. The encryption keys used by the chosen symmetric algorithm can be stored, in an encrypted fashion, in the extended metadata block of the data file, and such encryption keys can be decrypted by using the attributed-based encryption technique (e.g., KP-ABE schema). In cases where transformations of the read results are desired, fully and/or partially homomorphic schemas can be utilized.

Various embodiments of the invention provide different views of an encrypted dataset depending upon security credentials and/or contextual information. As described herein, a "view" of a dataset can be considered as the results of executing a selective, customized, tailored, restricted, and/or otherwise limited read operation on the dataset. That is, different views can be generated based on different security credentials and/or different computing contexts. Thus, when a user inputs their security credentials, the user can access only an authorized view of the dataset and not the entire and/or raw dataset (e.g., the user can read only certain data entries and/or transformations of data entries). Generally, conventional techniques deal with data privacy by treating it as a security problem; that is, by adding additional layers of encryption and/or access-control to screen out unauthorized users. Conventional techniques do not transparently enforce data privacy protection at a data format level by enforcing different views of a dataset based on credentials and/or context. As explained herein, a data owner can write/store a dataset one time, and the dataset can be encrypted one time. In various cases, a view policy can be defined, which can comprise a set of credentials mapped to a set of view instructions (e.g., in some cases, each credential can encode, contain, and/or otherwise convey its corresponding view instruction). In various aspects, each view instruction can specify which subsets of a dataset are permitted to be read during a read operation and/or can specify what transformations are to be applied to results of such a read operation. In various instances, when a security credential is inputted by a user desiring to access the dataset, the view instruction corresponding to that security credential can be identified, and the dataset can be read in compliance with the identified view instruction. Thus, the user can be granted access only to a portion of the dataset and not to the entire and/or raw dataset, per the desires of the data owner.

As explained above, various embodiments of the invention can reduce replication of the dataset and can reduce time and/or processing power spent on encryption of the dataset, which are concrete technical improvements to computing performance. Moreover, even if an attacker manages to steal a credential from an authorized user, that attacker can be granted access only to the limited and/or transformed portions of the dataset that are permitted by the view instruction corresponding to the stolen credential, rather than being granted access to the entire/raw dataset. Thus, various embodiments of the invention further boost the security of encrypted datasets, which again is a tangible benefit.

Figure 10:
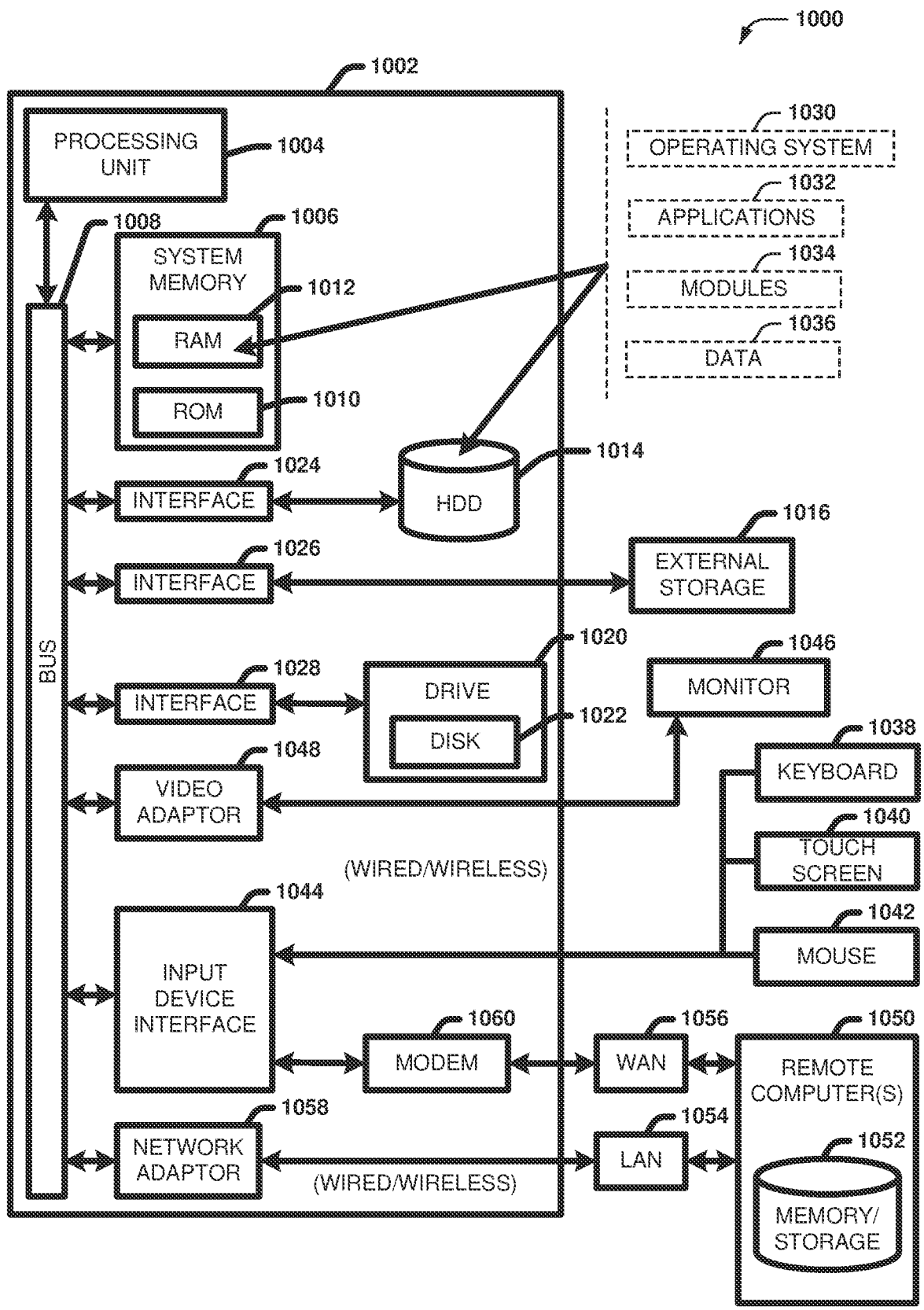
FIG. 10 illustrates a block diagram of an example, non-limiting operating environment in which one or more embodiments described herein can be facilitated.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
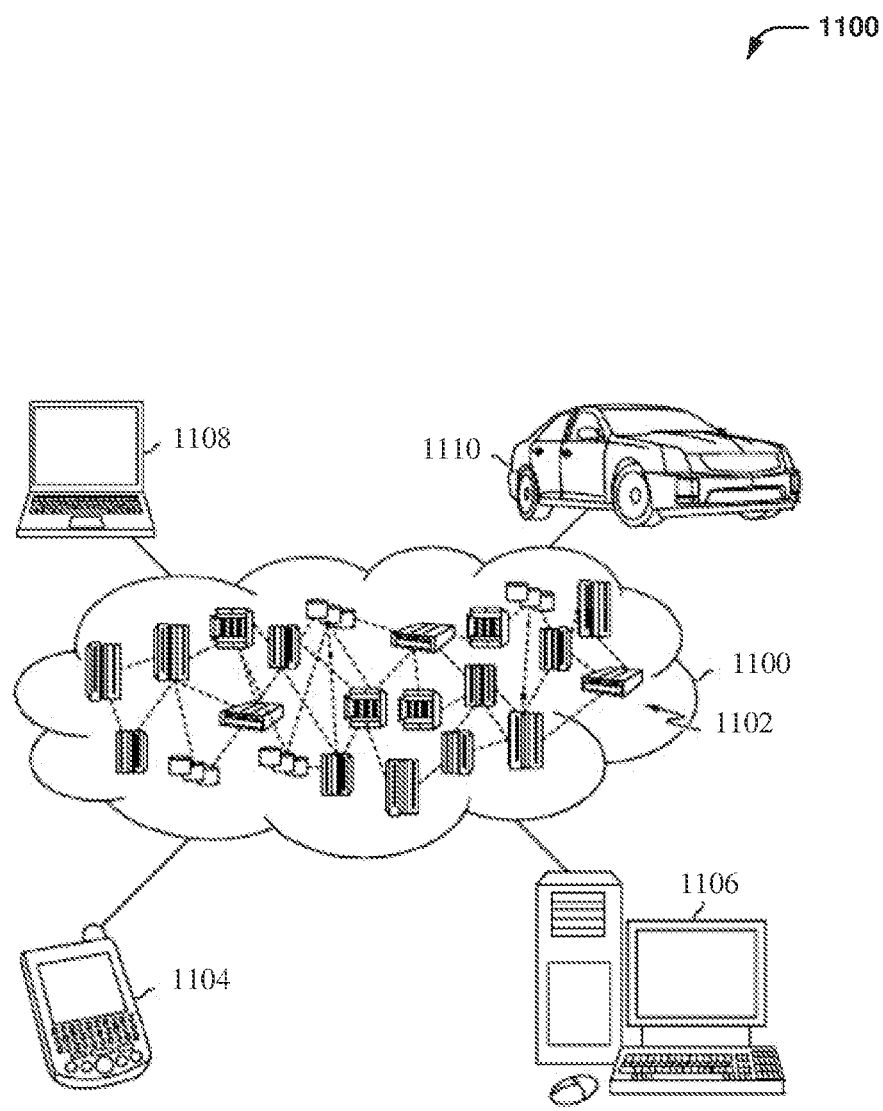
FIG. 11 illustrates an example, non-limiting cloud computing environment in accordance with one or more embodiments described herein.

Referring now to FIG. 11, illustrative cloud computing environment 1100 is depicted. As shown, cloud computing environment 1100 includes one or more cloud computing nodes 1102 with which local computing devices used by cloud consumers, such as, for example, personal digital assistant (PDA) or cellular telephone 1104, desktop computer 1106, laptop computer 1108, and/or automobile computer system 1110 may communicate. Nodes 1102 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1104-1110 shown in FIG. 11 are intended to be illustrative only and that computing nodes 1102 and cloud computing environment 1100 can communicate with any type of computerized device over any type of network and/or network addressable connection (e.g., using a web browser).

Figure 12:
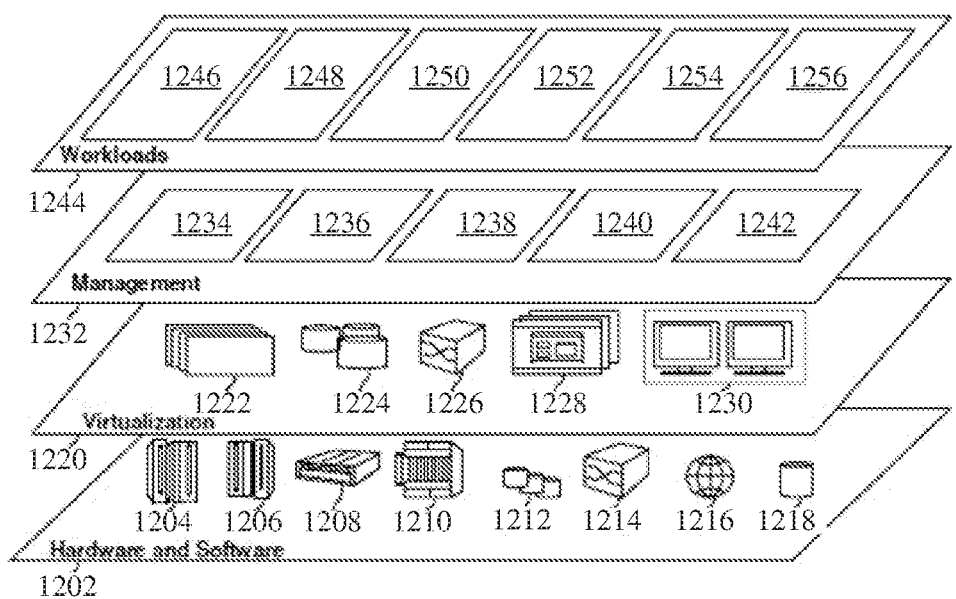
FIG. 12 illustrates example, non-limiting abstraction model layers in accordance with one or more embodiments described herein.

Referring now to FIG. 12, a set of functional abstraction layers provided by cloud computing environment 1100 (FIG. 11) is shown. Repetitive description of like elements employed in other embodiments described herein is omitted for sake of brevity. It should be understood in advance that the components, layers, and functions shown in FIG. 12 are intended to be illustrative only and embodiments of the invention are not limited thereto. As depicted, the following layers and corresponding functions are provided.

Hardware and software layer 1202 includes hardware and software components. Examples of hardware components include: mainframes 1204; RISC (Reduced Instruction Set Computer) architecture based servers 1206; servers 1208; blade servers 1210; storage devices 1212; and networks and networking components 1214. In some embodiments, software components include network application server software 1216 and database software 1218.

Virtualization layer 1220 provides an abstraction layer from which the following examples of virtual entities may be provided: virtual servers 1222; virtual storage 1224; virtual networks 1226, including virtual private networks; virtual applications and operating systems 1228; and virtual clients 1230.

In one example, management layer 1232 may provide the functions described below. Resource provisioning 1234 provides dynamic procurement of computing resources and other resources that are utilized to perform tasks within the cloud computing environment. Metering and Pricing 1236 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1238 provides access to the cloud computing environment for consumers and system administrators. Service level management 1240 provides cloud computing resource allocation and management such that required service levels are met. Service Level Agreement (SLA) planning and fulfillment 1242 provide pre-arrangement for, and procurement of, cloud computing resources for which a future requirement is anticipated in accordance with an SLA.

Workloads layer 1244 provides examples of functionality for which the cloud computing environment may be utilized. Examples of workloads and functions which may be provided from this layer include: mapping and navigation 1246; software development and lifecycle management 1248; virtual classroom education delivery 1250; data analytics processing 1252; transaction processing 1254; and differentially private federated learning processing 1256. Various embodiments of the present invention can utilize the cloud computing environment described with reference to FIGS. 11 and 12 to execute one or more differentially private federated learning process in accordance with various embodiments described herein.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adaptor card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a processor that executes computer-executable components stored in a computer-readable memory, the computer-executable components comprising:
  a data component that accesses a data file comprising a dataset, wherein the dataset is organized in a tabular structure within the data file; and
  a view policy component that:
   generates a set of view instructions, wherein respective view instructions are restricted to access different subsets of the dataset within the data file via access control restrictions to different portions of the tabular structure within the data file, and wherein respective subsets of the different subsets comprise different combinations of at least one of rows or columns of the tabular structure;
   generates a set of security credentials; and
   maps the set of security credentials to the set of view instructions.

2. The system of claim 1, wherein the computer-executable components further comprise:
 an input component that receives as input a first security credential that is listed in the set of security credentials; and
 an output component that identifies a first view instruction that is listed in the set of view instructions associated with the dataset, wherein the first view instruction is mapped to the first security credential, and wherein the output component generates as output a view of the dataset based on the first view instruction.

3. The system of claim 2, wherein the view policy component further maps a set of computing contexts to the set of view instructions, wherein the input component further receives as input a first computing context that is listed in the set of computing contexts, and wherein the first view instruction is mapped to both the first security credential and the first computing context.

4. The system of claim 2, wherein the view comprises a transformation of a subset of the dataset.

5. The system of claim 2, wherein the first security credential is a password or a user identifier.

6. The system of claim 1, wherein the data component encrypts the dataset.

7. The system of claim 1, wherein the dataset exhibits a relational data structure or a graph data structure.

8. A computer-implemented method, comprising:
 accessing, by a system operatively coupled to a processor, a data file comprising a dataset, wherein the dataset is organized in a tabular structure within the data file;
 generating, by the system, a set of view instructions, wherein respective view instructions are restricted to access different subsets of the dataset within the data file via access control restrictions to different portions of the tabular structure within the data file, and wherein respective subsets of the different subsets comprise different combinations of at least one of rows or columns of the tabular structure;
 generating, by the system, a set of security credentials; and
 mapping, by the system, the set of security credentials to the set of view instructions.

9. The computer-implemented method of claim 8, further comprising:
 receiving, by the system, as input a first security credential that is listed in the set of security credentials;
 identifying, by the system, a first view instruction that is listed in the set of view instructions associated with the dataset, wherein the first view instruction is mapped to the first security credential; and
 generating, by the system, as output a view of the dataset based on the first view instruction.

10. The computer-implemented method of claim 9, further comprising:
   mapping, by the system, a set of computing contexts to the set of view instructions associated with the dataset; and
   receiving, by the system, as input a first computing context that is listed in the set of computing contexts, wherein the first view instruction is mapped to both the first security credential and the first computing context.

11. The computer-implemented method of claim 9, wherein the view comprises a transformation of a subset of the dataset.

12. The computer-implemented method of claim 9, wherein the first security credential is a password or a user identifier.

13. The computer-implemented method of claim 8, further comprising:
   encrypting, by the system, the dataset.

14. The computer-implemented method of claim 8, wherein the dataset exhibits a relational data structure or a graph data structure.

15. A computer program product for facilitating policy-driven views of datasets, the computer program product comprising a computer-readable memory having program instructions embodied therewith, the program instructions executable by a processor to cause the processor to:
   access, by the processor, a data file comprising a dataset, wherein the dataset is organized in a tabular structure within the data file;
   generate a set of view instructions, wherein respective view instructions are restricted to access different subsets of the dataset within the data file via access control restrictions to different portions of the tabular structure within the data file, and wherein respective subsets of the different subsets comprise different combinations of at least one of rows or columns of the tabular structure;
   generate a set of security credentials; and
   map, by the processor, the set of security credentials to the set of view instructions associated with the dataset.

16. The computer program product of claim 15, wherein the program instructions are further executable to cause the processor to:
   receive, by the processor, as input a first security credential that is listed in the set of security credentials;
   identify, by the processor, a first view instruction that is listed in the set of view instructions associated with the dataset, wherein the first view instruction is mapped to the first security credential; and
   generate, by the processor, as output a view of the dataset based on the first view instruction.

17. The computer program product of claim 16, wherein the program instructions are further executable to cause the processor to:
   map, by the processor, a set of computing contexts to the set of view instructions associated with the dataset; and
   receive, by the processor, as input a first computing context that is listed in the set of computing contexts, wherein the first view instruction is mapped to both the first security credential and the first computing context.

18. The computer program product of claim 16, wherein the view comprises a transformation of a subset of the dataset.

19. The computer program product of claim 16, wherein the first security credential is a password or a user identifier.

20. The computer program product of claim 15, wherein the program instructions are further executable to cause the processor to:
   encrypt, by the processor, the dataset.

* * * * *